US009336204B1

(12) United States Patent
Amundsen et al.

(10) Patent No.: US 9,336,204 B1
(45) Date of Patent: May 10, 2016

(54) TECHNIQUES FOR MODIFYING THE COMPLEXITY OF LITERARY CONTENT

(71) Applicant: Amazon Technologies, Inc., Reno, NV (US)

(72) Inventors: Kristin Ann Amundsen, Los Osos, CA (US); Timothy Albert Laferriere, Nipomo, CA (US); Troy Franklin Thacker, San Luis Obispo, CA (US); Nathaniel John Reid, San Luis Obispo, CA (US); Erick Craig Pierce, Atascadero, CA (US); Wayne Claus Heaney, San Luis Obispo, CA (US); Quan Gan, San Luis Obispo, CA (US); Tommy Lee Bennett, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 14/030,911

(22) Filed: Sep. 18, 2013

(51) Int. Cl.
*G06F 17/28* (2006.01)
*G06F 17/27* (2006.01)

(52) U.S. Cl.
CPC .................................. *G06F 17/2795* (2013.01)

(58) Field of Classification Search
USPC ...................................................... 704/4–10
See application file for complete search history.

(56) References Cited

U.S. PATENT DOCUMENTS

| | | | | |
|---|---|---|---|---|
| 8,226,416 | B2* | 7/2012 | Abrash | G09B 5/04 434/156 |
| 2003/0097636 | A1* | 5/2003 | Cleveland | B42D 1/00 715/202 |
| 2003/0152895 | A1* | 8/2003 | Reisz | G09B 17/00 434/178 |
| 2005/0039121 | A1* | 2/2005 | Cleveland | B42D 1/00 715/256 |
| 2009/0172022 | A1* | 7/2009 | Bathiche | G06F 17/2264 |
| 2010/0153889 | A1* | 6/2010 | Krause | G06F 3/0219 715/856 |
| 2011/0306023 | A1* | 12/2011 | Blank | G09B 17/003 434/178 |
| 2012/0088211 | A1* | 4/2012 | Massaro | G09B 17/006 434/178 |
| 2013/0084549 | A1* | 4/2013 | Blank | G09B 17/003 473/178 |

* cited by examiner

*Primary Examiner* — Leonard Saint Cyr
(74) *Attorney, Agent, or Firm* — Weaver Austin Villeneuve & Sampson LLP

(57) ABSTRACT

Techniques are described for delivering electronic literary content in a way that adjusts the reading level of the content for the reader while maintaining the overall story context. The adjustment may be made in response to a request by a user or automatically without any user intervention.

20 Claims, 4 Drawing Sheets

TECHNIQUES FOR MODIFYING THE COMPLEXITY OF LITERARY CONTENT

BACKGROUND

Literary content is increasingly being consumed electronically; much in the form of electronic books and periodicals downloaded to e-readers and tablet devices such as the Amazon® Kindle®. Despite the phenomenal growth in recent years of this mode of delivering and consuming content, content providers are only beginning to explore ways in which the reader's experience may be enhanced beyond the basic service offerings now available. As the market for electronic books continues to grow, content providers look to provide service offerings designed to customize and personalize each reader's experience.

DETAILED DESCRIPTION

Figure 1A:
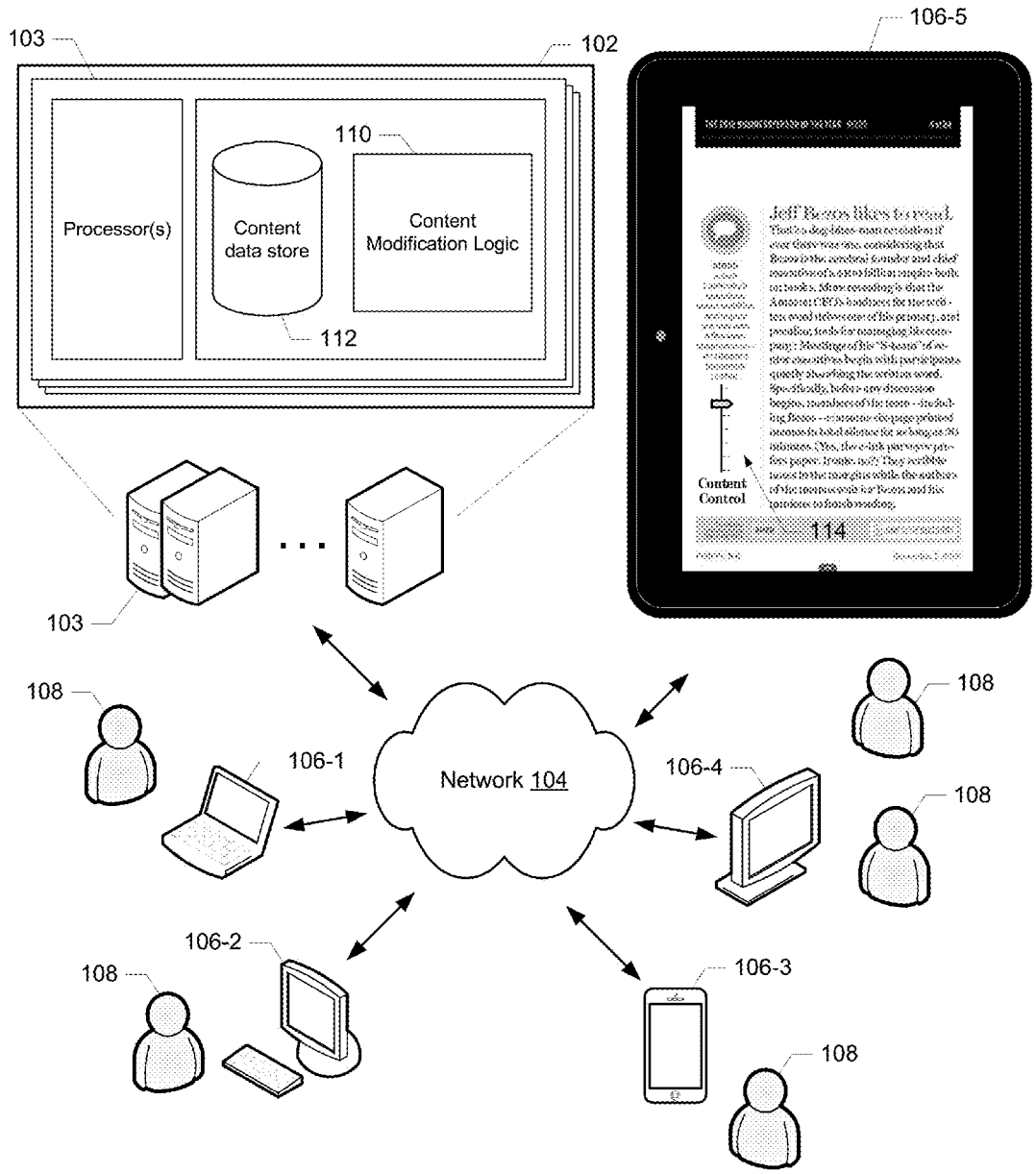
FIG. 1A is a simplified diagram of a computing environment in which literary content may be delivered to readers as described herein.

This disclosure describes techniques for delivering electronic literary content in a way that adjusts the reading level of the content for the reader while maintaining the overall story context. The adjustment may be made in response to an explicit request by a user (e.g., via an interface control), or automatically (e.g., in response to the identity of the reader or other detected conditions). The adjustments involve modification of the literary content and may take a variety of forms such as, for example, replacing particular words with synonymous words or phrases, modifying grammar and/or syntax, adding or eliminating portions of the content, changing the font size, adding or eliminating visual images, etc.

For example, a child might have a favorite illustrated storybook that her mother reads to her every night. As the child begins learning to read, she still may not be able to read the story herself because the book may have been written at a reading level intended for an older reader to read aloud. However, if the reading level of the story is adjusted to the reading level of a beginning reader while otherwise maintaining the story images and context, the child will be able to read the book earlier than she would have otherwise.

In another example, a child might have a favorite book written at the reading level of a beginning reader. As the child gets older, she may still wish to read the book but, because the reading level is so low, the book no longer provides a sufficient challenge to help the child improve her reading skills. However, if the reading level of the book is adjusted to that of a more advanced reader, the child may continue to read her favorite story while being challenged by a reading level that will help her to continue to improve her reading skills.

In yet another example, the techniques described herein may be a powerful tool for learning a new language. That is, a reader learning a new language may read and re-read a particular book, increasing the reading level each time he reaches a level of comfort with the subject matter. As will be appreciated with reference to the foregoing examples, the benefits of the techniques described herein may be realized in a variety of ways.

One approach to providing alternate versions of literary content at different reading levels is to manually create and store the separate versions in advance, e.g., with the help of the author or other human editors. However, such an approach by itself would not be scalable to the enormous volume of literature now in electronic form. Therefore, a particular class of implementations takes a dynamic approach to modifying literary content in conjunction with providing the content to the reader. As will be appreciated with reference to the following description, modification to the content may occur in conjunction with the initial delivery of the content to a requesting user. Alternatively, it may be modified subsequent to the initial delivery, e.g., in response to activation of a user interface control for adjusting the reading level. And the modification may occur in response to explicit requests from the user, or automatically in response to detection of various conditions or events. Further, the literary content that can be adjusted as described herein may correspond to a wide variety of types of written content including, for example, books, magazines, news sources, web logs, online commentary, copy associated with other types of content, reviews, etc. Virtually any type of written content in electronic form may be modified as described herein.

As used herein, the term "reading level" relates to one or more aspects of literary content that have been connected with a particular level of linguistic and/or conceptual sophistication of a user group. As will be discussed and depending upon the implementation, this sophistication may be represented by a variety of characteristics of the literary content including, for example, vocabulary, grammar, syntax, sentence structure, font size, subject matter, illustrations, etc. A reading level may be defined by assigning various levels and combinations of these characteristics to that reading level. For example, particular words in a dictionary may be tagged with a corresponding reading level. A reading level might also be defined by selecting particular rules relating to grammar, syntax, sentence structure, etc. A user group associated with a particular reading level might be defined by age or some other characteristics such as, for example, whether the language of the literary content is that group's first language. The wide range of possibilities for defining reading levels will be apparent to those of skill in the art.

As used herein, the term "literary content" refers to any written content in any natural language that may be stored and presented electronically. This includes works of literature, but also includes a wide variety of other content available electronically and/or online. For example, such content might include online magazines, newspapers, blogs, and any platform or site on which content may be consumed electronically. Such content may also include commercial content such as, for example, advertising copy, product specifications, product reviews, user manuals, etc. The term literary content may be used in some instances to refer in the abstract the a particular work by a particular author but, depending on the context may also refer to a particular version of that work. The scope of the invention should therefore not be limited to the particular examples described herein.

FIG. 1A illustrates an example of a computing environment in which literary content may be delivered as described herein by service 102 via network 104 to a variety of client devices (106-1 through 106-5) associated with users 108. Service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc. In addition, at least some of the examples described herein contemplate various distributed computing implementations based on computing models that enable ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Figure 2:
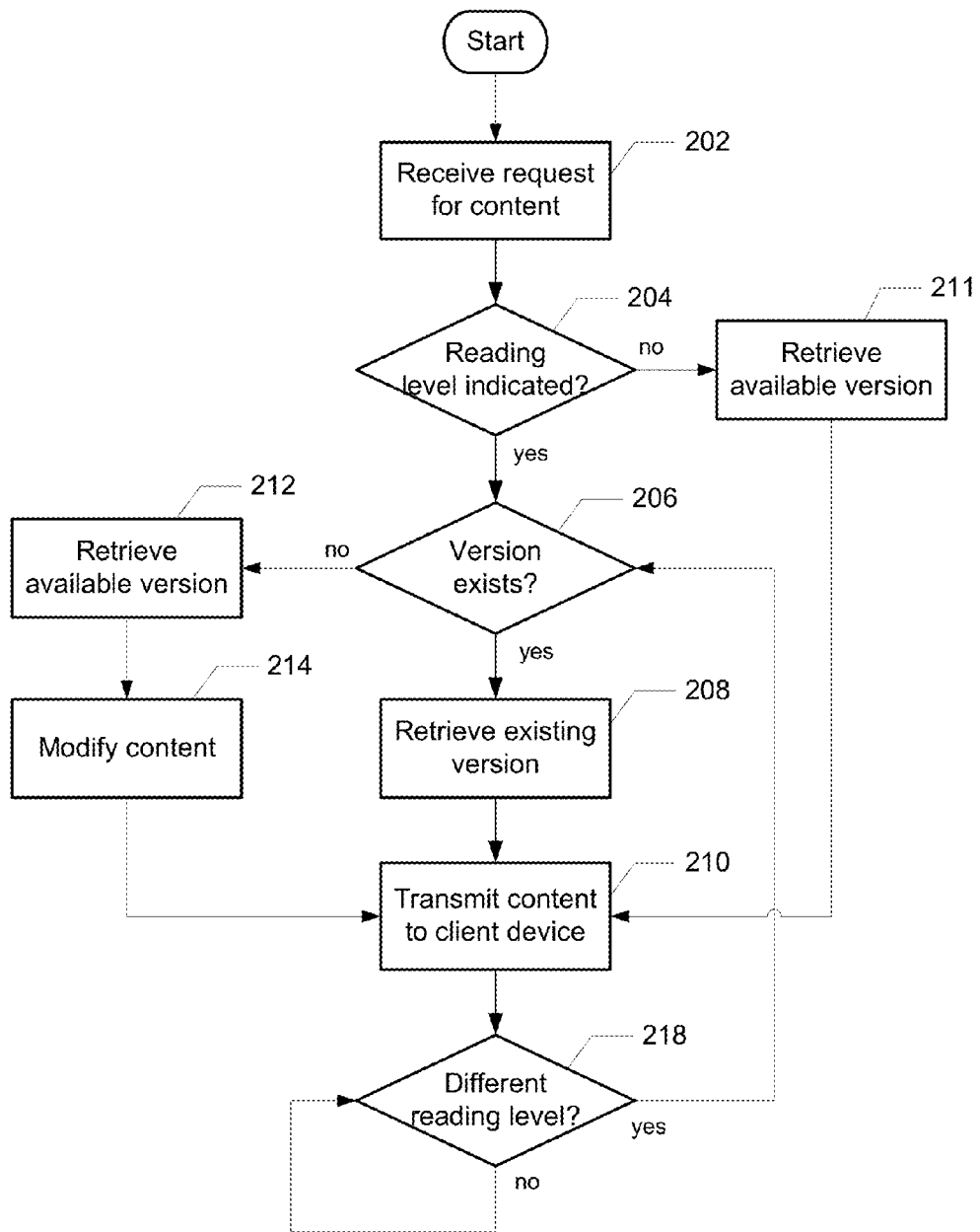
FIG. 2 is a flowchart illustrating the delivery of literary content according to techniques described herein.

Service 102 may be, for example, a content service (e.g., an online electronic book retailer, a news site, a web log, an online magazine, etc.) from which consumers may consume various types of content including literary content. As with conventional services, service 102 may include various types of logic and provide interfaces with which users may search for and download or connect with content (not shown for clarity). In addition, service 102 includes content modification logic 110 configured to adjust the reading level of literary content (represented in associated data store 112) in response to a request from, an action taken by, or the identity of a particular user as described herein. It should be noted that, while content modification logic 110 and data store 112 are both shown as part of service 102, implementations are contemplated in which either or both operate remotely from service 102, and/or either or both are under the control of an independent entity. A flowchart illustrating the operation of a particular implementation is shown in FIG. 2.

A request for literary content is received (202). Such a request might originate, for example, from a client device such as tablet 106-5 of FIG. 1A and might be received by a content service such as, for example, service 102. If the request for the content is accompanied by an indication of a particular reading level at which the content is to be delivered (204), the system determines whether a version of the content at the indicated reading level exists (206), e.g., from a previously stored modification of the content. If so, that version of the content is retrieved (208), e.g., from data store 112, and transmitted to the requesting device (210). The indication of the reading level might have been generated in response to an action by the user requesting the content, e.g., selection of an option presented in a user interface on the client device in association with the content being requested.

Alternatively, the indication of reading level might be automatically set or detected by the system. For example, the system might select the reading level based on the identity of the requesting reader. This might be done by selecting a known reading level associated with the reader. The known reading level for that reader might be determined in a number of ways such as, for example, with reference to the user's reading history (i.e., previous literary content consumed by the reader). In another example, the known reading level might be determined based on the ways in which the reader interacted with content in the past, e.g., various measures of reading speed or comprehension (discussed below). In yet another example, the known reading level may be explicitly selected, e.g., by the reader herself or by another user such as, for example, a parent using parental controls to specify the reading level for her child.

If the reading level is not indicated (204), the available version of the content is retrieved (211) and transmitted to the requesting device (210). If the reading level is indicated (204) but a version of the requested content at the indicated reading level does not exist (206), an existing version of the content, e.g., the original version or another version at a different reading level, is retrieved (212), e.g., from data store 112, and the retrieved content is modified to correspond to the indicated reading level, thereby generating a new version of the content (214). Various ways in which the content may be modified are described below. The new version of the content is then transmitted to the requesting device (216).

Once content has been modified to correspond to a particular reading level, the new versions of the content can be saved for subsequent use, as well as input to machine-learning algorithms. Further efficiencies may be gained by pre-calculating modifications for various reading levels for popular content. More generally, while some classes of implementations contemplate a significant amount of dynamic modification of content, use of previously modified content is also contemplated. Moreover, it should be noted that implementations are contemplated in which reading level modifications are entirely dynamic, in which case, the existing version of the content might be retrieved without first determining whether a reading level has been indicated. Other variations will be apparent to those of skill in the art.

According to some implementations, the reading level of content may be adjusted after it has been delivered to a requesting device. That is, whether the original version or a modified version of the content has been delivered to the requesting device, a condition may be detected that indicates that a different reading level is desired or required (218). Again, if a version corresponding to the new reading level already exists (206), that version is retrieved (208) and transmitted to the client device (210). Alternatively, if an appropriate version does not exist, an existing version is retrieved, modified, and transmitted (212-216).

Figure 1B:
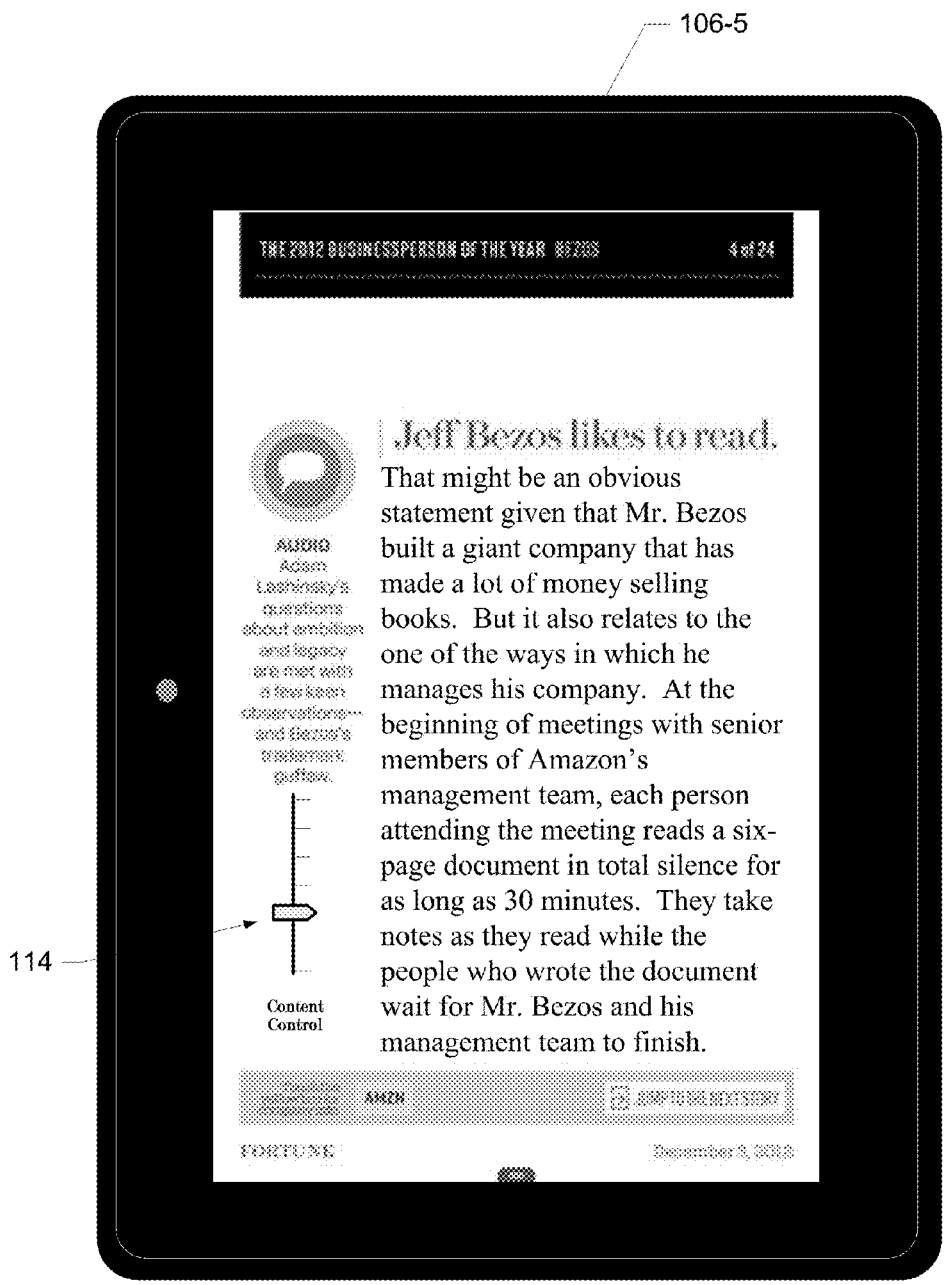
FIG. 1B illustrates the modification of literary content on a device depicted in FIG. 1A.

The detected condition that triggers delivery of a version of the content at the new reading level may vary considerably. According to a particular implementation, the reader is provided with a user interface control that enables selection of the reading level. For example, as shown in FIG. 1A, such a user interface control 114 may be presented in conjunction with the content; in the depicted example, a slider control is provided which allows the user to select more or less sophisticated reading levels for content that has already been delivered. As illustrated in FIG. 1B, for example, a downward adjustment of slider control 114 results in a simpler version of the text being presented to the user. As will be appreciated a wide variety of other controls (e.g., dials, buttons, drop down menus, etc.) may be used. As will also be appreciated, such controls may also be employed along with the initial request for literary content to specify a desired reading level.

In another example, data from the client device representing the reader's interaction with a previously delivered version of the content may be used to determine that a version at a different reading level may be needed. For example, it may be determined that a reader is struggling with the content using data representing the reading pace of the reader (e.g., as indicated by a page turn rate), or using eye-tracking software that detects that the gaze of the reader is dwelling on particular passages or words. Another indication could be the number of definition requests the reader has made for specific words in the content. According to implementations that employ such mechanisms, the reader may be given the option of enabling or disabling such capabilities ahead of time.

In yet another example, the detected condition that triggers delivery of a new version of the content may correspond to the reader selecting words, phrases, or entire passages for modification. That is, for example, if the reader selects a block of text she might be given the option of receiving a modified version of the selected text at a different reading level. That is, implementations are contemplated in which only portions of a particular version of content may be translated; either as directed by the reader (directly or indirectly), or triggered by some other mechanism.

According to some implementations, the reading level corresponding to a new version of content may correspond to a pre-defined set of characteristics that correspond to or are associated with that reading level. According to other implementations, a reading level may be generated dynamically for a particular user. Such a reading level might be a completely new or unique reading level and/or an intermediate reading level between existing reading levels, and may be determined, for example, with reference to the identity of the user and the user's interaction with the content. That is, the user's interaction with content might indicate that a vocabulary and sentence structure corresponding to an intermediate-level reader is appropriate, while the known age or previous reading habits of the reader might indicate that the maturity of the subject matter is toward the higher end of the spectrum. This new reading level might be unique to the reader, or might be applicable in the future to a new category of readers.

When converting from one reading level to another, it may be important to preserve narrative, chronologic, or linear context. For example, if a user is reading a first version of literary content and a decision is made to present a different reading level (either by the user or by some other mechanism), the user should experience as seamless a transition as possible, e.g., the user should be presented with new content that corresponds to the same point in the old content. As should be appreciated, this may actually be a different page number and/or location on a page. This may be accomplished, for example, by providing markers in different versions of the same content that identify correspondence between the different text.

Figure 3:
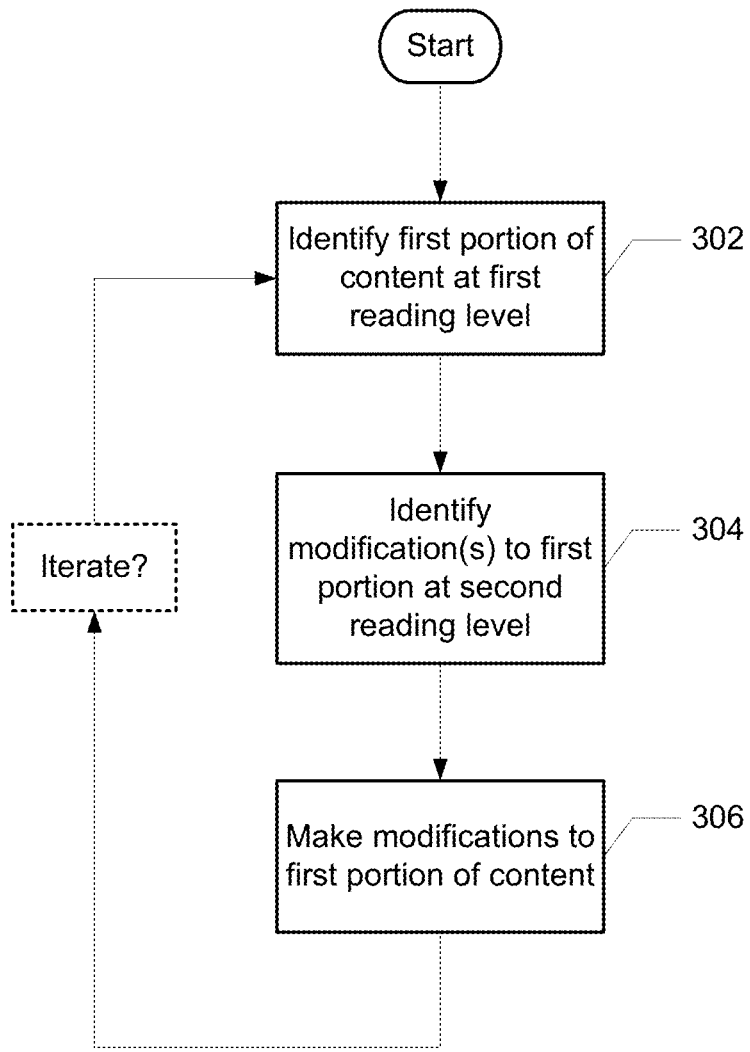
FIG. 3 is a flowchart illustrating an example of modification of literary content.

According to various implementations, the techniques by which the reading level of literary content is modified may vary considerably and may include various combinations of multiple techniques. According to some implementations, identification of portions of one version of content for modification and the nature of the modifications themselves are determined with reference to available resources such as, for example, dictionaries, thesauruses, logic, algorithms and rules sets as mentioned elsewhere herein. More generally, such a resource may be any kind of electronically stored information that at least partially defines one or more reading levels, and by which a reading level for a given portion of content may be determined, and/or by which a suitable modification or substitution for the portion of content may be determined to result in a different reading level. Referring to FIG. 3, one or more portions of content (e.g., words, phrases, sentences, etc.) in the first version of content are identified as corresponding to a first reading level with reference to one or more such resources (302). Suitable modifications (e.g., word or phrase replacements) corresponding to the second reading level are then identified with reference to the one or more resources (304). The modifications are then made such that a new version of the content is created that corresponds to the second reading level (306). The process may then iterate if additional content remains.

For example, modification of the content may involve replacement of particular words or phrases with more or less sophisticated synonyms or synonymous phrases. This may be achieved using dictionaries and/or thesauruses (e.g., stored in data store 112 or a separate data store) in which words and phrases and their alternatives are each tagged with a corresponding reading level. This kind of replacement may include replacement of offensive words and phrases with less offensive alternatives. Modification may also involve changing the font or font size of the text of the literary content.

Grammar, syntax, and/or sentence structure may also be modified. For example, long or complex sentences can be broken into multiple sentences having simpler structures. Content modification logic may include sets of rules and algorithms which govern how modifications are made from one reading level to another. For example, particular reading levels might be characterized by rules which specify how long sentences may be, or how many identifiable clauses may be included in the same sentence.

According to some implementations, modification may involve changing the number and/or placement of illustrations and other visual content; including the possibility of removing illustrations entirely, e.g., turning them "on" or "off." Illustrations may also be replaced with more or less sophisticated illustrations, e.g., illustrations with fewer or more details, or more age-appropriate illustrations. Age-appropriate modifications may also be applied to the literary content itself. In addition to the replacement of offensive words or phrases as mentioned above, sections of content that may not be appropriate for readers of a certain age, e.g., sexual or violent content, may be revised, summarized, or removed entirely. Implementations are also contemplated in which the content is modified from one dialect of a particular language to another. For example, Australian idioms could replace American or British idioms. As will be appreciated, these various alternatives for modifying content to correspond to a particular reading level may be used in various combinations without limitation.

An example of the modification of a sentence from one reading level to another may be illustrative. Suppose that the original version of a passage of a book reads: "I honor your circumspection. A fortnight's acquaintance is certainly very little." (Dialogue from Mr. Bennet in Chapter II of Jane Austen's *Pride and Prejudice*). Because this passage is written in an archaic idiom of the Victorian era in England, and is intended for relatively sophisticated audience, it may not be understandable for a beginning or intermediate reading in the United States in the 21$^{st}$ century. However, by replacing particular words and phrases as described herein, the new version of the passage might read: "How sensible of you. Knowing someone for two weeks is not very long." The value of such a capability should be apparent from this example.

Machine-learning techniques may be employed with various implementations to train content modification logic and to improve performance over time. That is, machine-learning algorithms may interact with the various dictionaries, thesauruses and rule sets employed by the system and/or embodied in the system's content modification logic, and the literary content itself to learn grammar simplification, syntax simplification, vocabulary simplification, paraphrasing, etc. A variety of input may be provided as training data and feedback to such algorithms. For example, multiple titles by the same author, or multiple writing samples by the same author at different reading levels can help with modification of a particular author's work. Human reader feedback on the quality of modified content may also be used. This input might include, for example, feedback from the authors themselves, professional editors, and readers (including crowd sourcing techniques to solicit such feedback). Previously translated versions of the same content (including manually modified versions of content) may also be used. Statistics that track words and phrases that readers select for definition and/or modification may be employed as well. In some cases, an author might provide versions corresponding to different points of a reading level spectrum, and a machine-learning algorithm could use this input to generate one or more versions at other reading levels on the spectrum in relation to the simpler and more complex versions provided by the author. Such an approach may serve to ensure that the author's intent and the overall story context is better preserved.

As part of machine-learning, graphs may be built and evolved representing the content, dictionaries, thesauruses, rule sets, and reading levels to assist machine-learning algorithms in various aspects of content modification, e.g., word or phrase replacement, grammar and syntax simplification, etc. Further, different graphs and/or versions of machine-learning algorithms could be trained to modify content that corresponds to a particular reading level; literary genre; historical period; writing style or voice (e.g., Hemmingway's style); dialect of a particular language, etc.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    storing a first version of literary content in a data store in a computing network, the first version of the literary content corresponding to a first reading level;
    with one or more computing devices, receiving a request for the literary content from a remote device via the computing network;
    with the one or more computing devices, receiving an indication to provide the literary content at a second reading level;
    using the one or more computing devices, identifying first words and first sentence structures in the first version of the literary content using an electronic resource that electronically stores reading level information corresponding to the first reading level and a second reading level, the first and second reading levels being characterized by different levels of reader sophistication, the first words and the first sentence structures being identified by the electronic resource as corresponding to the first reading level;
    using the one or more computing devices, identifying modifications to the first version of the literary content using the electronic resource to identify associations among the first words and the first sentence structures and second words and second sentence structures, the second words and the second sentence structures being identified by the electronic resource as corresponding to the second reading level, the modifications being based on the second words and the second sentence structures;
    using the one or more computing devices, modifying the first version of the literary content by replacing the first words with the second words, modifying the first sentence structures to correspond to the second sentence structures, and one or more of modifying grammar, adding or eliminating portions of the literary content, changing a font of the literary content, changing a font size of the literary content, or adding or eliminating illustrations associated with the literary content, thereby transforming the first version of the literary content into a second version of the literary content; and
    transmitting the second version of the literary content from the one or more computing devices to the remote device via the computing network.

2. The method of claim 1, wherein the indication to provide the literary content at the second reading level is generated in response to data generated by the remote device representing interactions of a reader associated with the remote device with the literary content, or an identity of the reader.

3. The method of claim 2, wherein the data representing the interactions of the reader with the literary content represent one or both of a reading pace of the reader, or definition requests by the reader.

4. A computer-implemented method, comprising:
    storing a first version of literary content in a data store in a computing network, the first version of the literary content corresponding to a first reading level;
    using one or more computing devices, identifying first words and first sentence structures in the first version of the literary content using an electronic resource that electronically stores reading level information corresponding to the first reading level and a second reading level, the first and second reading levels being characterized by different levels of reader sophistication, the first words and the first sentence structures being identified by the electronic resource as corresponding to the first reading level;
    using the one or more computing devices, identifying modifications to the first version of the literary content using the electronic resource to identify associations among the first words and the first sentence structures and second words and second sentence structures, the second words and the second sentence structures being identified by the electronic resource as corresponding to the second reading level, the modifications being based on the second words and the second sentence structures;
    using the one or more computing devices, modifying the first version of the literary content by replacing the first words with the second words and modifying the first sentence structures to correspond to the second sentence structures, thereby transforming the first version of the literary content into a second version of the literary content; and transmitting the second version of the literary content from the one or more computing devices to a remote device via the computing network.

5. The method of claim 4, further comprising receiving a request for the literary content from a remote device via the computing network, wherein generation of the second version of the literary content occurs prior to receiving the request for the literary content from the remote device.

6. The method of claim 4, further comprising receiving a request for the literary content from a remote device via the computing network, wherein generation of the second version of the literary content and transmission of the second version of the literary content to the remote device are both responsive to the request for the literary content from the remote device.

7. The method of claim 4, further comprising:
receiving a request for the literary content from the remote device; and
receiving an indication to provide the literary content at a second reading level, wherein the indication to provide the literary content at the second reading level is received in conjunction with the request for the literary content, or wherein the indication to provide the literary content at the second reading level is received after the first version of the literary content is delivered to the remote device.

8. The method of claim 4, further comprising receiving an indication to provide the literary content at a second reading level, wherein the indication to provide the literary content at the second reading level is generated in response to activation of a user interface control on the remote device, or wherein the indication to provide the literary content at the second reading level is generated automatically.

9. The method of claim 8, wherein the indication to provide the literary content at the second reading level is generated automatically in response to data generated by the remote device representing interactions of a reader associated with the remote device with the literary content, or an identity of the reader.

10. The method of claim 9, wherein the data representing the interactions of the reader with the literary content represent one or both of a reading pace of the reader, or definition requests by the reader.

11. The method of claim 9, further comprising defining the second reading level with reference to the data representing the interactions of the reader with the literary content.

12. The method of claim 4, wherein modifying the first version of the literary content comprises one or more of replacing words with synonyms, replacing phrases with synonymous phrases, modifying grammar, modifying syntax, modifying sentence structures, adding or eliminating portions of the literary content, changing a font of the literary content, changing a font size of the literary content, or adding or eliminating illustrations associated with the literary content.

13. A system for modifying literary content, comprising:
a data store for storing a first version of literary content, the first version of the literary content corresponding to a first reading level; and
one or more computing devices configured to:
identify first words and first sentence structures in the first version of the literary content using an electronic resource that electronically stores reading level information corresponding to the first reading level and a second reading level, the first and second reading levels being characterized by different levels of reader sophistication, the first words and the first sentence structures being identified by the electronic resource as corresponding to the first reading level;
identify modifications to the first version of the literary content using the electronic resource to identify associations among the first words and the first sentence structures and second words and second sentence structures, the second words and the second sentence structures being identified by the electronic resource as corresponding to the second reading level, the modifications being based on the second words and the second sentence structures;
modify the first version of the literary content by replacing the first words with the second words and modifying the first sentence structures to correspond to the second sentence structures, thereby transforming the first version of the literary content into a second version of the literary content; and
transmit the second version of the literary content to a remote device via the computing network.

14. The system of claim 13, wherein the one or more computing devices are further configured to receive a request for the literary content from a remote device via the computing network, wherein the one or more computing devices are configured to transmit the second version of the literary content to the remote device in response to the request for the literary content, and wherein the one or more computing devices are configured to generate the second version of the literary content prior to receiving the request for the literary content from the remote device.

15. The system of claim 13, wherein the one or more computing devices are further configured to receive a request for the literary content from a remote device via the computing network, and wherein the one or more computing devices are configured to generate the second version of the literary content and transmit the second version of the literary content to the remote device in response to the request for the literary content from the remote device.

16. The system of claim 13, wherein the one or more computing devices are further configured to receive a request for the literary content from the remote device, and receive an indication to provide the literary content at a second reading level, wherein the indication to provide the literary content at the second reading level is received in conjunction with the request for the literary content, or wherein the indication to provide the literary content at the second reading level is received after the first version of the literary content is delivered to the remote device.

17. The system of claim 13, wherein the one or more computing devices are further configured to receive an indication to provide the literary content at a second reading level, wherein the indication to provide the literary content at the second reading level is generated in response to activation of a user interface control on the remote device, or wherein the indication to provide the literary content at the second reading level is generated automatically.

18. The system of claim 17, wherein the indication to provide the literary content at the second reading level is generated automatically in response to data generated by the remote device representing interactions of a reader associated with the remote device with the literary content, or an identity of the reader.

19. The system of claim 18, wherein the one or more computing devices are further configured to define the second reading level with reference to the data representing the interactions of the reader with the literary content.

20. The system of claim 13, wherein the one or more computing devices are configured to modify the first version of the literary content by one or more of replacing words with synonyms, replacing phrases with synonymous phrases, modifying grammar, modifying syntax, modifying sentence structures, adding or eliminating portions of the literary content, changing a font of the literary content, changing a font size of the literary content, or adding or eliminating illustrations associated with the literary content.

\* \* \* \* \*